United States Patent [19]

Brown

[11] Patent Number: 5,201,561
[45] Date of Patent: Apr. 13, 1993

[54] STORAGE UNIT FOR USE IN PICKUP TRUCKS

[76] Inventor: Michael F. Brown, 44 Hector La., Novato, Calif. 94949

[21] Appl. No.: 656,217

[22] Filed: Feb. 15, 1991

[51] Int. Cl.⁵ .............................................. B60R 9/00
[52] U.S. Cl. .................................. 296/37.5; 296/37.6; 296/100; 410/129; 160/213
[58] Field of Search ............... 296/37.5, 37.6, 100, 296/106, 24.1; 410/129, 142; 224/42.42; 220/531, 523; 160/213

[56] References Cited

U.S. PATENT DOCUMENTS

| | | | |
|---|---|---|---|
| 1,918,475 | 7/1933 | Lassinsky | 296/106 |
| 3,988,032 | 10/1976 | Weinstein | 296/76 |
| 4,397,497 | 8/1983 | Alonzo, Jr. et al. | 296/100 X |
| 4,451,075 | 5/1984 | Canfield | 296/37.6 |
| 4,580,827 | 4/1986 | Feagan | 296/37.6 |
| 4,659,136 | 4/1987 | Martin et al. | 296/100 |
| 4,750,773 | 6/1988 | Chapline et al. | 296/37.5 X |
| 4,824,162 | 4/1989 | Geisler et al. | 296/100 |
| 4,900,080 | 2/1990 | Morris, II | 296/37.6 X |

Primary Examiner—Dennis H. Pedder

[57] ABSTRACT

A storage box for use on pickup trucks which is mainly composed of a lid 10 and flap 12 which when each are hinged and secured to the truck bed create a versatile unit capable of protected and secure storage or other positions of usage that permit easy utilization of the space or compact storage when not installed.

1 Claim, 6 Drawing Sheets

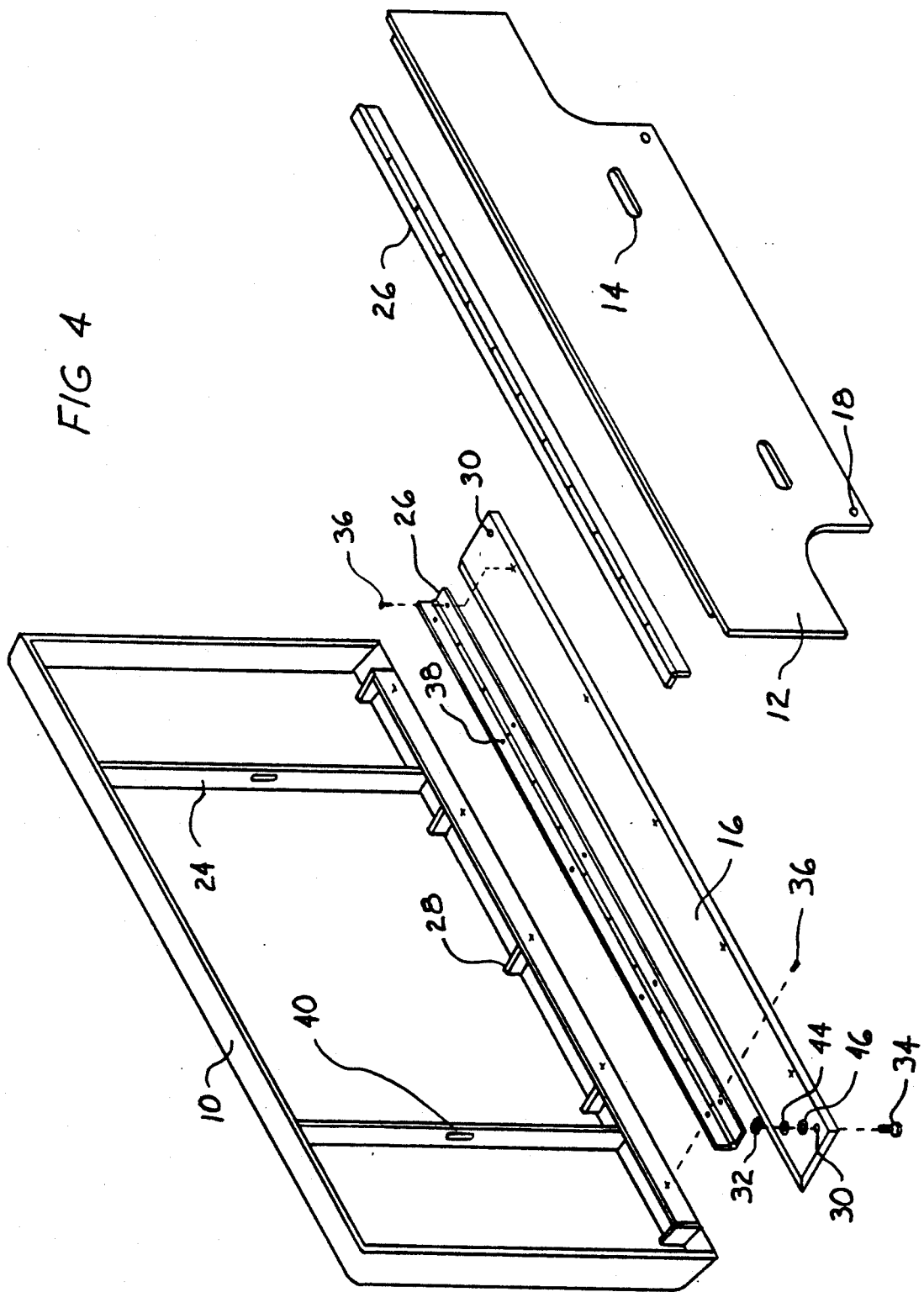

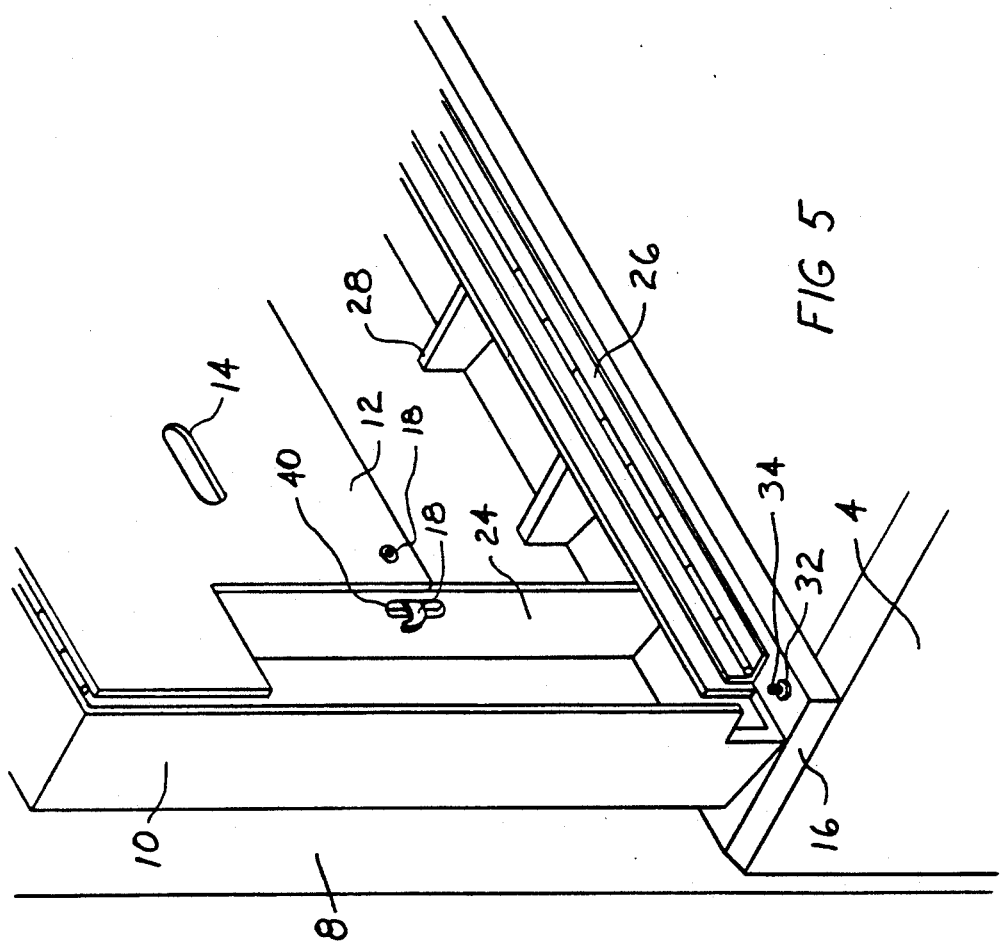

STORAGE UNIT FOR USE IN PICKUP TRUCKS

BACKGROUND—FIELD OF INVENTION

This invention relates to protective storage boxes for use in a pickup truck bed, providing a variety of functional uses and features.

BACKGROUND—DESCRIPTION OF PRIOR ART

Heretofore, pickup truck storage boxes have been designed and constructed such that they are bulky, heavy, and of limited capacity and function. Installation and removal of said boxes usually required two people to perform. Most prior designs consumed a large portion of the available space in a truck bed, making transport of large objects impossible that would otherwise fit in the truck bed. These prior designs also required large storage spaces when not installed in a truck bed.

OBJECTS AND ADVANTAGES

Readers will find objects and advantages to the invention from a consideration of the ensuring description and the accompanying drawings.

DRAWING FIGURES

FIG. 4 shows an exploded view of the invention and its construction.

FIG. 5 shows a detail view of the invention in the completely upright and secured position.

Figure 6A:
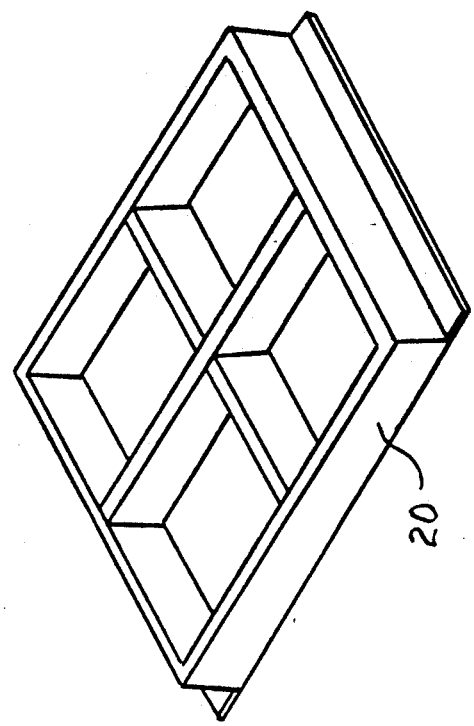
Figure 6B:
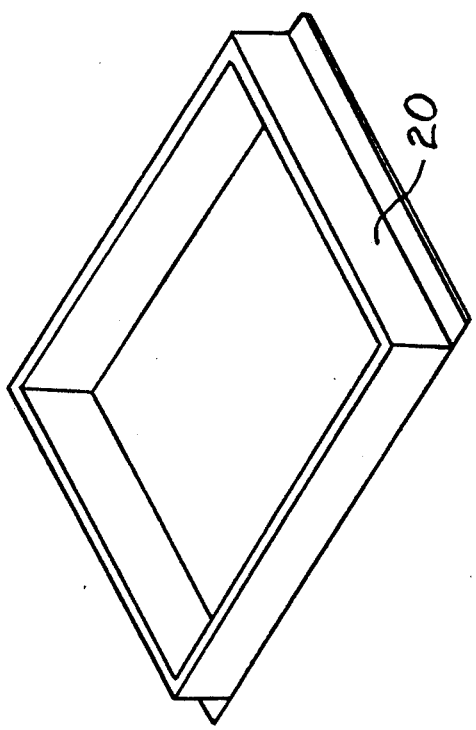

FIGS. 6A and 6B each show an optional tray for use with the lid and flap assembly.

DRAWING REFERENCE NUMERALS

2: rear window of truck
4: bed of truck
6: wheel wells of truck
8: cab of truck
10: lid
12: flap
14: handles
16: mounting strip
18: cylinder locking assemblys
20: tray
22: hasps
24: support ribs
26: piano hinges
28: hinge support ribs
30: holes in #16
32: nuts for #16
34: bolts for #16
36: screws for #26
38: holes in #26
40: slots in #24
42: channels for sliding #20
44: lock washers for #16
46: flat washers for #16

DESCRIPTION OF THE INVENTION

Figure 1:
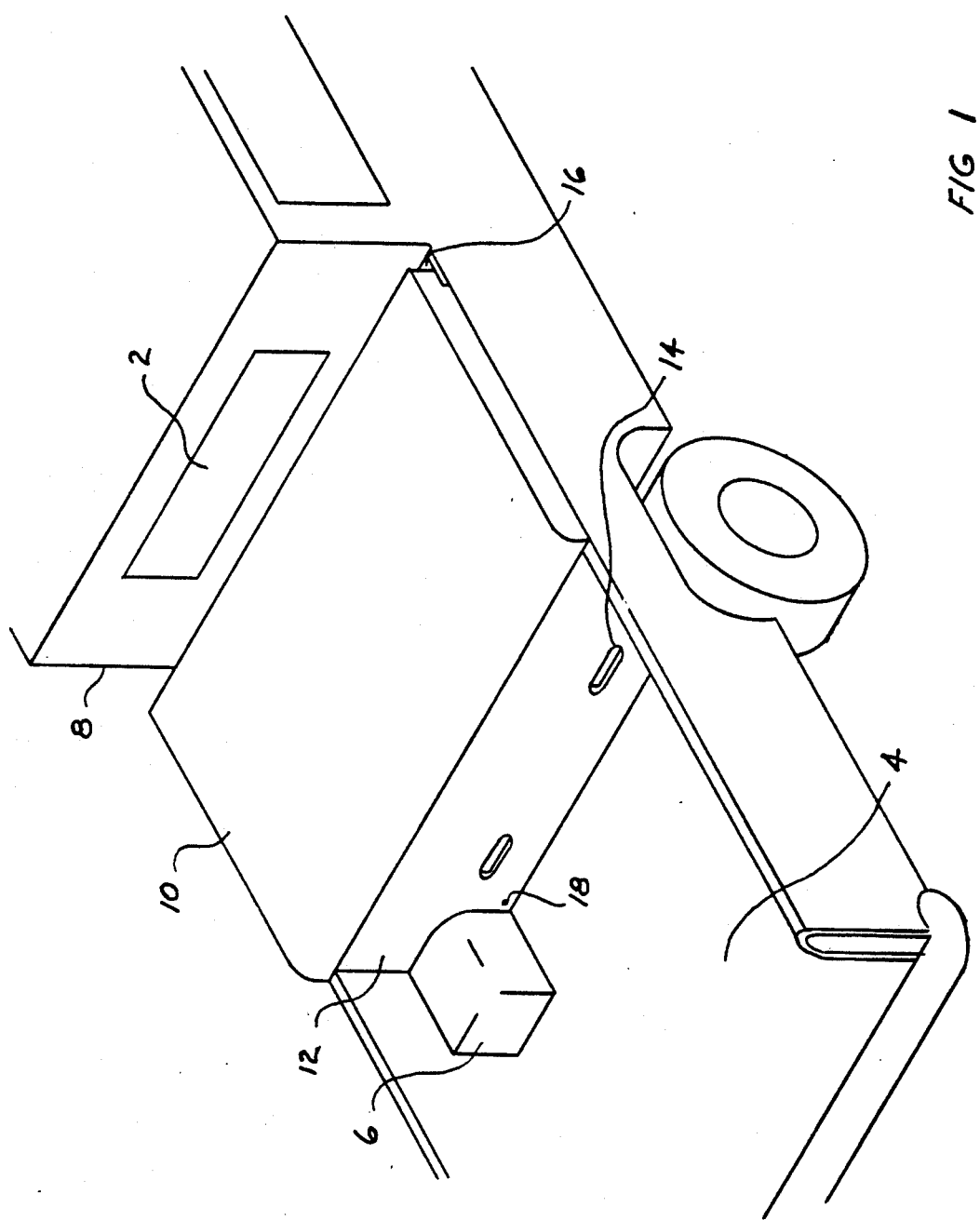
FIG. 1 shows a perspective top view of the invention in the closed position.

Referring to FIG. 1, a pickup truck rear window designated 2, and bed 4, are shown and may be any sort of commonly manufactured open bed vehicle. The invention fits between wheel wells 6, and directly behind the cab of the truck 8.

A lid 10 works in coaction with the flap 12 forming the principal enclosure. Handles or other lifting aids 14 may be part of the flap 12. A mounting strip 16 facilitates mounting the lid 10 to the forward portion of the truck bed 4.

FIG. 4 shows the lid 10 reinforced with support ribs 24 which are slotted 40 for engagement to locking assembly 18 when in the raised position. Further reinforcement is provided with hinge support ribs 28 which have an integrate mounting surface for attaching hinge 26 with screws 36 to the mounting strip 16.

Various fasteners 32, 34, 44, 46, installed through holes 30 in mounting strip 16 secure the entire lid assembly to the forward portion of the truck bed.

A second hinge 26 mounts to the inside face of the lid 10 and the flap 12 with screws 36 passing through appropriate holes 38 as required.

DESCRIPTION OF OPERATION

Referring to FIG. 1, the invention is shown in the lowered and secured position. This position provides for a weather resistant enclosed space that can be made secure by virtue 4 of locking mechanisms 18 on either side of flap 12.

Figure 2:
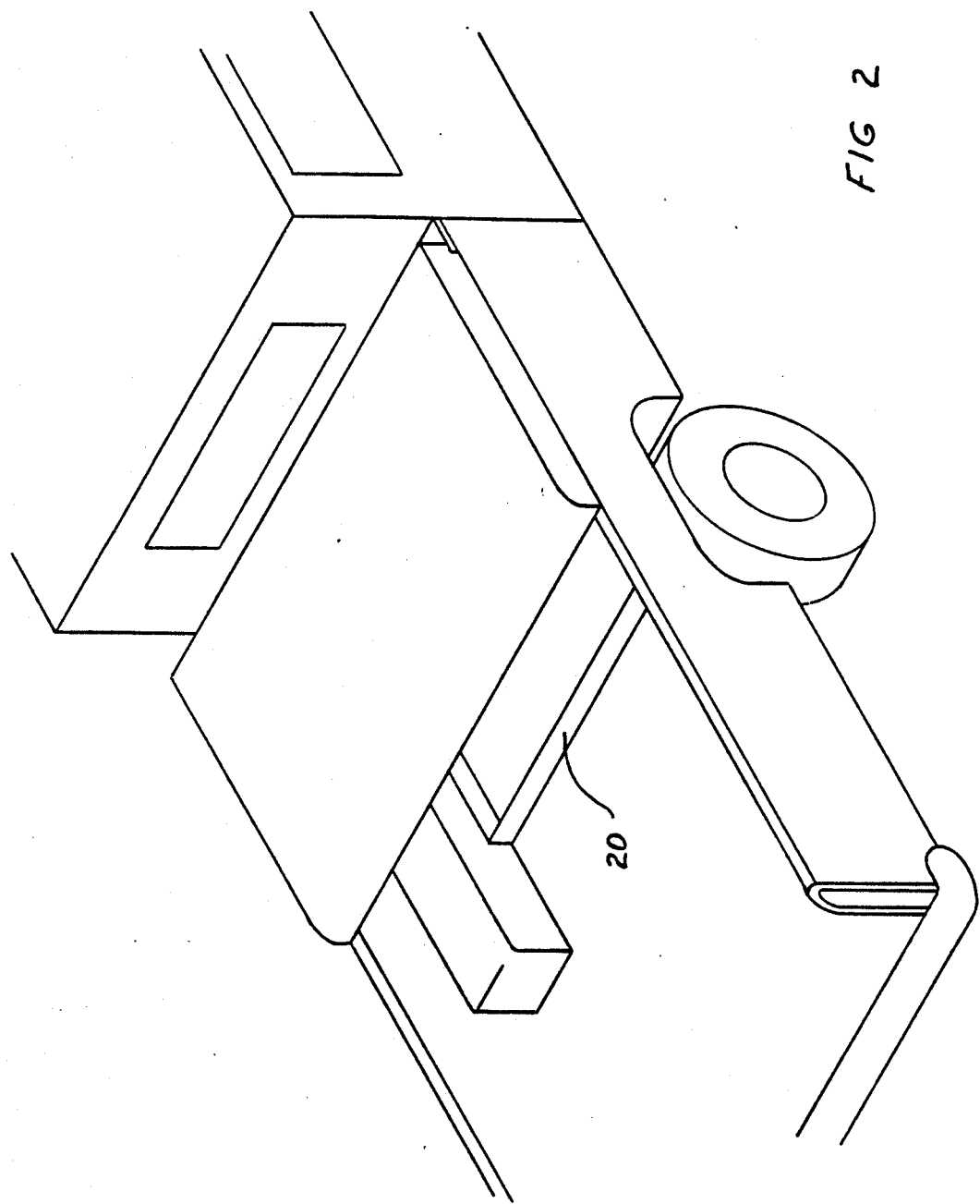
FIG. 2 shows a perspective top view of the invention with the flap raised and secured.
Figure 3:
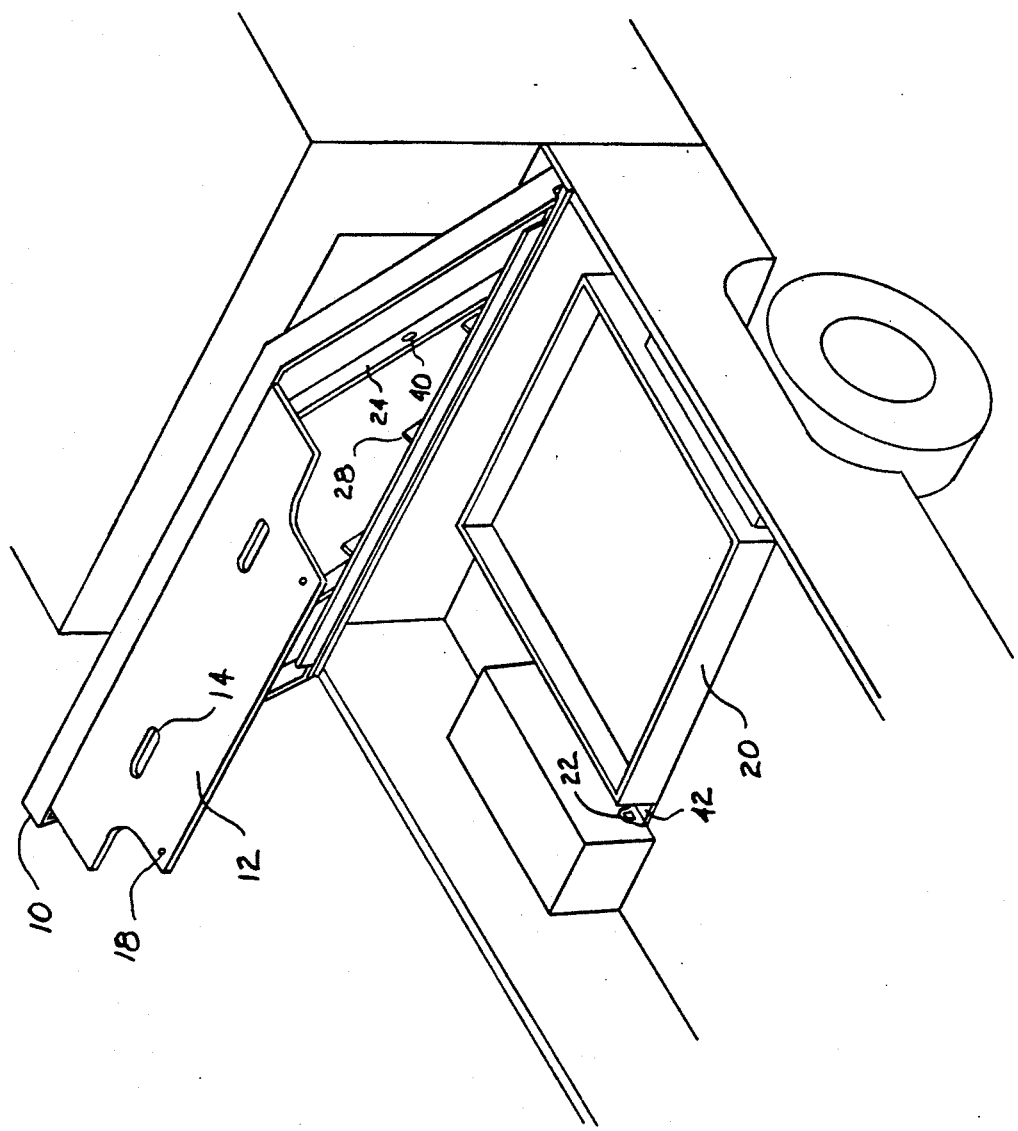
FIG. 3 shows a perspective top view of the invention with the lid raised, exposing the optional tray.

By raising the entire lid 10 and the flap 12 assembly, and using the locking mechanisms 18 to secure the flap 12 to the underside of the lid 10 and then lowering the lid 10 and the flap 12 assembly once again, a protected but unsecure storage area is created. This does make it possible to use the entire length of the truck bed while maintaining a rearward view through the rear window 2 of the truck cab 8 as shown in FIG. 2.

A third position is possible wherein the flap 12 is secured to the lid 10 as described above but the entire assembly is raised to a vertical position thereby making the entire bed space available for large items or stacks of items to whatever height is allowed by law.

While the above descriptions contain many functional features and positions of usage, the reader should not construe these as limitations on the scope of the invention, but merely as exemplifications of preferred embodiments thereof. Those skilled in the art will envision many other possible variations are within its scope. For example, skilled artisans will readily be able to change the dimensions and shapes of the embodiments. They will be able to make the invention and its embodiments of various materials such as wood, metal, and plastic. They can make many variations on the locking and hinge mechanisms. They can make certain embodiments adjustable to accommodate various truck bed sizes and configurations. They can change the design of the mounting strip 16 to accommodate various means of attaching the invention to the truck bed. They can add or delete certain features, e.g. eliminating the lid to flap hinge, or adding a mechanism to secure the lid and flap assembly in an upright position. Accordingly the reader is requested to determine the scope of the invention by the appended claims and their legal equivalents, and not by the examples which have been given.

I claim:

1. A storage unit for use in pickup trucks, comprising:
a first member, a generally flat and horizontal panel which is attached to a forward topmost edge of a pickup truck bed by means of removable fasteners, and;

a second member, a generally flat panel pivotally mounted adjacent a forward edge thereof by first hinge means to the first member, thus allowing the second member to rotate to a generally vertical orientation parallel to and just behind a rear cab window, and;

a third member, a generally flat panel pivotally mounted by second hinge means to the second member at a rearwardmost edge of the second member which allows said third member to rotate relative to the second member such that with the second member generally horizontal and the third member generally vertical, said first, second, and third members form an enclosed space with the truck bed which can be made secure by latch means and which when the second and third members are raised, the second and third members articulate about the first and second hinge means to become parallel to one another in said generally vertical orientation.

* * * * *